(12) United States Patent
Laurila et al.

(10) Patent No.: US 6,591,116 B1
(45) Date of Patent: Jul. 8, 2003

(54) MOBILE EQUIPMENT AND NETWORKS PROVIDING SELECTION BETWEEN USIM/SIM DEPENDENT FEATURES

(75) Inventors: Pasi Laurila, Tupos (FI); Jan Kall, Espoo (FI); Heikki Einola, Espoo (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/326,958

(22) Filed: Jun. 7, 1999

(51) Int. Cl.$^7$ ................................................ H04B 1/38
(52) U.S. Cl. ...................................... 455/558; 455/552
(58) Field of Search ................................ 455/558, 418, 455/419, 426, 552, 553

(56) References Cited

U.S. PATENT DOCUMENTS

| | | | |
|---|---|---|---|
| 5,266,782 A | 11/1993 | Alanara et al. | 235/380 |
| 5,315,638 A | 5/1994 | Mukari | 379/58 |
| 5,353,328 A | 10/1994 | Jokimies | 379/58 |
| 5,448,622 A | 9/1995 | Huttunen | 379/58 |
| 5,487,084 A | 1/1996 | Lindholm | 375/215 |
| 5,600,708 A | 2/1997 | Meche et al. | 379/59 |
| 5,675,628 A | * 10/1997 | Hokkanen | 379/58 |
| 5,887,250 A | 3/1999 | Shah | 455/411 |
| 6,134,443 A | * 10/2000 | Spann | 455/450 |

FOREIGN PATENT DOCUMENTS

| | | |
|---|---|---|
| EP | 0 786 915 A | 7/1997 |
| GB | 2319438 A | 5/1998 |
| WO | WO 94/30023 A | 12/1994 |
| WO | WO 98/26625 A | 6/1998 |

OTHER PUBLICATIONS

"Digital cellular telecommunications system (Phase 2+); Specification of the Subscriber Identity Module—Mobile Equipment (SIM—ME) interface" Draft ) GSM 11.11 version 5.8.0), Dec., 1997, pp. 1–127.
"Any Network, Any Terminal, Anywhere" Fasbender, A. et al., IEEE Personal Communications, US, IEEE Communications Society, vol. 6, No. 2, Apr. 1999, pp 22–30.
Draft GSM 11.11 version 5.8.0, Dec. 1997, p. 24.

* cited by examiner

*Primary Examiner*—Lee Nguyen
(74) *Attorney, Agent, or Firm*—Harrington & Smith, LLP

(57) ABSTRACT

A mobile equipment (10), such as a cellular radio telephone, includes a controller (18) coupled to a wireless transceiver (14, 16) for bidirectionally communicating with one of a plurality of different networks (32, 32'), such as a GSM network and a Universal Mobile Telecommunications System (UMTS) network. A data storage module (28), referred to herein as a SIM/USIM or as a UICC (UMTS Integrated Circuit Card), is readably coupled to the controller. The module stores information for specifying at least an identification and the operational capabilities of the module in each of the plurality of different networks. The controller is responsive to a request received from one of the plurality of networks through the transceiver for accessing the module to retrieve the stored information and for transmitting the retrieved information to the requesting one of the networks through the transceiver.

28 Claims, 4 Drawing Sheets

MOBILE EQUIPMENT AND NETWORKS PROVIDING SELECTION BETWEEN USIM/SIM DEPENDENT FEATURES

FIELD OF THE INVENTION

This invention relates in general to the field of mobile terminals and wireless telecommunications networks and, more particularly, to methods and apparatus for selectively enabling, continuing or disabling certain applications when moving between different types of networks.

BACKGROUND OF THE INVENTION

In the Global System for Mobile Communications (GSM) there exists a Subscriber Identity Module (SIM) that can typically be pluggably connected and disconnected to a mobile terminal. The SIM stores information regarding a particular user. The SIM has well defined and limited capabilities, and the network-side Visitor Location Register (VLR) and Home Location Register (HLR) are capable of inter-operating with different types of SIM cards.

By way of introduction, at page 24 of a document "Draft (GSM 11.11 version 5.8.0), December 1997" there is described the logical model for a SIM, the code associated with it, and the structure of files used. Reference is made to FIG. 4, which shows the organization of SIM memory and the general structural relationships which may exist between files. The files are organized in a hierarchical structure and are of one of three types as defined below. These files may be either administrative or application specific. The operating system handles the access to the data stored in different files.

Files are composed of a header, which is internally managed by the SIM, and optionally a body part. The header information is related to the structure and attributes of the file and may be obtained by using commands GET RESPONSE or STATUS. This information is fixed during the administrative phase. The body part contains the data of the file.

A file ID is used to address or identify each specific file. The file ID consists of two bytes and is coded in hexadecimal. The first byte identifies the type of file, and for GSM is: '3F' Master File (MF); '7F' 1st level Dedicated File (DF1); '5F' 2nd level Dedicated File (DF2); '2F' Elementary File under the Master File (EF); '6F' Elementary File under a 1st level Dedicated File; and '4F' Elementary File under 2nd level Dedicated File.

The File IDs are specified to be subject to the following conditions. First, the file ID is assigned at the time of creation of the file. Second, no two files under the same parent can have the same ID. And third, a child and any parent, either immediate or remote in the hierarchy, e.g. a grandparent, can have the same file ID. In this way each file is uniquely identified in the SIM.

It has been known in the art to provide different telephone number series to identify SIM cards with different capabilities, but this approach is wasteful of the finite telephone number space.

As modern wireless telecommunications systems evolve (such as the new so-called third generation (3G) systems) they offer the capability to provide users with even more functions, as well as more complicated functions and, as such, the problems related to identifying SIM cards with different functionality are becoming more prominent. A significant amount of standardization activity is underway to develop 3G systems, such as the Universal Mobile Telecommunications System (UMTS) and IMT-2000. Reference with regard to UMTS can be had to "Wideband CDMA for Third Generation Mobile Communications", Artech House Publishers, ISBN 0-89006-735-X, by Ojanperä and Prasad (particularly Chapter 12).

One basic problem relates to how the serving network can determine what kind of SIM or Universal Subscriber Identity Module (USIM) card is currently in use, and what its capabilities are, e.g., what applications is the SIM/USIM capable of executing? For example, if the network could determine the capabilities of the SIM/USIM card and the application(s) that it is capable of executing, then it can execute the desired application with the best possible input from the start. Another problem is simply how and where to best store the information about the SIM/USIM capabilities.

As such, it can be appreciated that problems have arisen that relate to how to most optimally handle and coordinate the increased functionality and capabilities that exist in and between modern wireless telecommunications systems, such as the new 3G systems, and 3G SIM/USIM subscriber cards. Another problem relates to dealing with the inter-operation and compatibility between current telecommunications systems (e.g., 2G systems) and 3G SIM/USIM cards and mobile terminals, in particular multi-band mobile terminals, such as those capable of operating in two or more frequency bands with two or more different network types (e.g., with a GSM network and also with a Universal Mobile Telecommunications System (UMTS) network.)

OBJECTS AND ADVANTAGES OF THE INVENTION

It is a first object and advantage of this invention to provide methods and apparatus for overcoming the foregoing and other problems.

It is a further object and advantage of this invention to provide a technique for optimizing a network-mobile equipment interaction and inter-operability, especially when using certain applications whose execution is network specific.

It is another object and advantage of this invention to provide an Integrated Circuit Card (ICC) that stores at least an identification and the operational capabilities of the ICC in each of a plurality of different networks, and that can be accessed by a mobile equipment to which the ICC is readably coupled.

It is a still further object and advantage of this invention to provide the Integrated Circuit Card (ICC) that stores at least the identification and the operational capabilities of the ICC in each of the plurality of different networks, that can be accessed by the mobile equipment to which the ICC is readably coupled, and to then provide for the mobile equipment to transmit the retrieved information back to a requesting network, such as to a VLR of the requesting network.

SUMMARY OF THE INVENTION

The foregoing and other problems are overcome and the objects of the invention are realized by methods and apparatus in accordance with embodiments of this invention.

In accordance with this invention a mobile equipment having 2G and/or 3G capabilities can run some applications in the network or in the mobile equipment, which may have a relationship to the SIM or USIM card that is in use. Alternatively the entire application can reside in the SIM/USIM card. This invention provides a technique for informing the network as to the capabilities of the application(s) of a particular mobile equipment, as the capabilities may affect the manner in which the application is executed.

One benefit of this inventive technique is that no SIM/USIM capability information need be stored in the network. Preferably, existing message types are used to relay the capability information from mobile equipment to the network. Also, existing SIM/USIM cards can store the information. An important benefit of the teaching of this invention is that the network can use the applications and new features in the SIM/USIM card in the best possible way.

In accordance with this invention a mobile equipment, such as a cellular radio telephone, includes a controller coupled to a wireless transceiver for bidirectionally communicating with one of a plurality of different networks, such as a GSM network and a Universal Mobile Telecommunications System (UMTS) network. A data storage module, referred to herein as a SIM/USIM or as a UICC (UMTS Integrated Circuit Card), is readably coupled to the controller. The module stores information for specifying at least an identification and the operational capabilities of the module in each of the plurality of different networks. The controller is responsive to a request received from one of the plurality of networks through the transceiver for accessing the module to retrieve the stored information and for transmitting the retrieved information to the requesting one of the networks through the transceiver.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
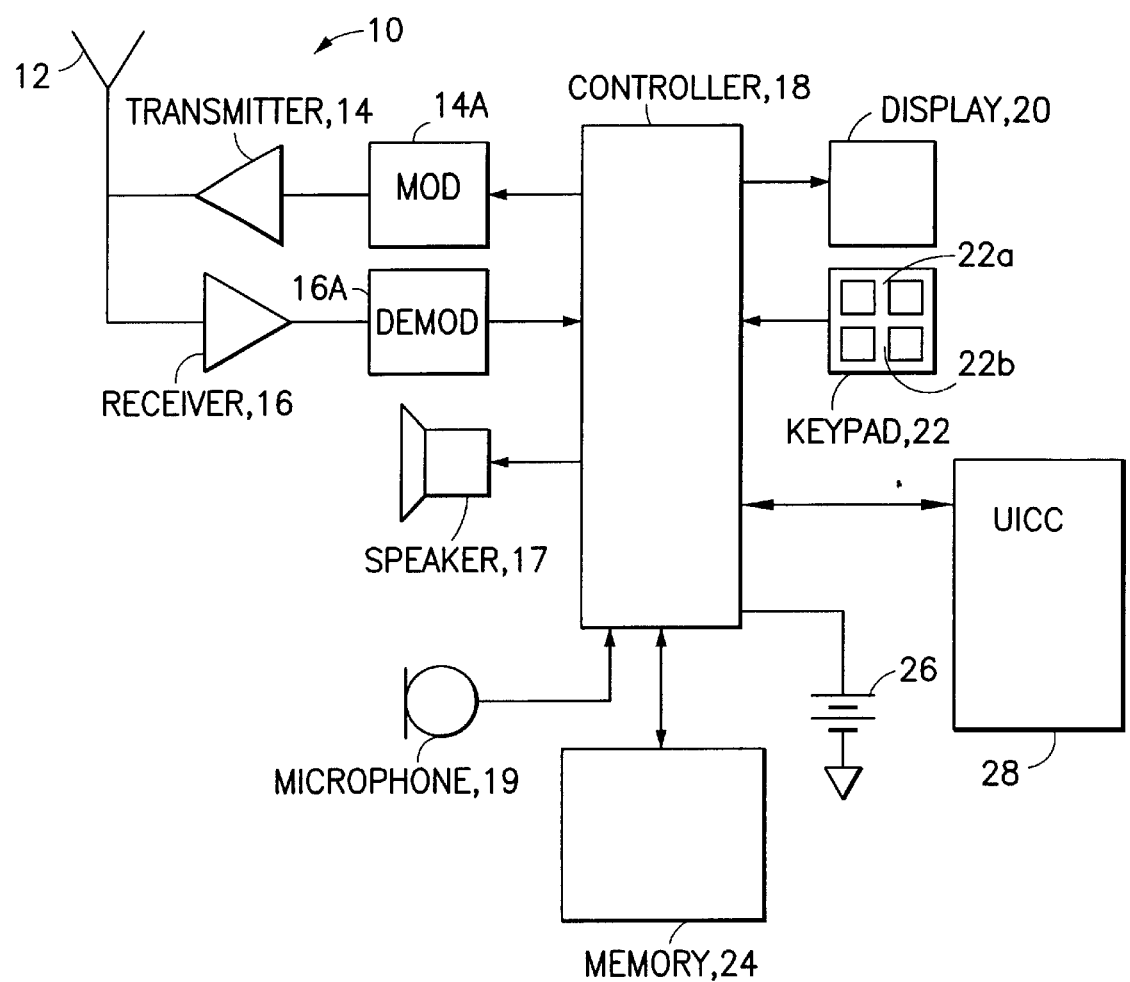
FIG. 1 is a block diagram of a mobile equipment that is constructed and operated in accordance with this invention.
Figure 2:
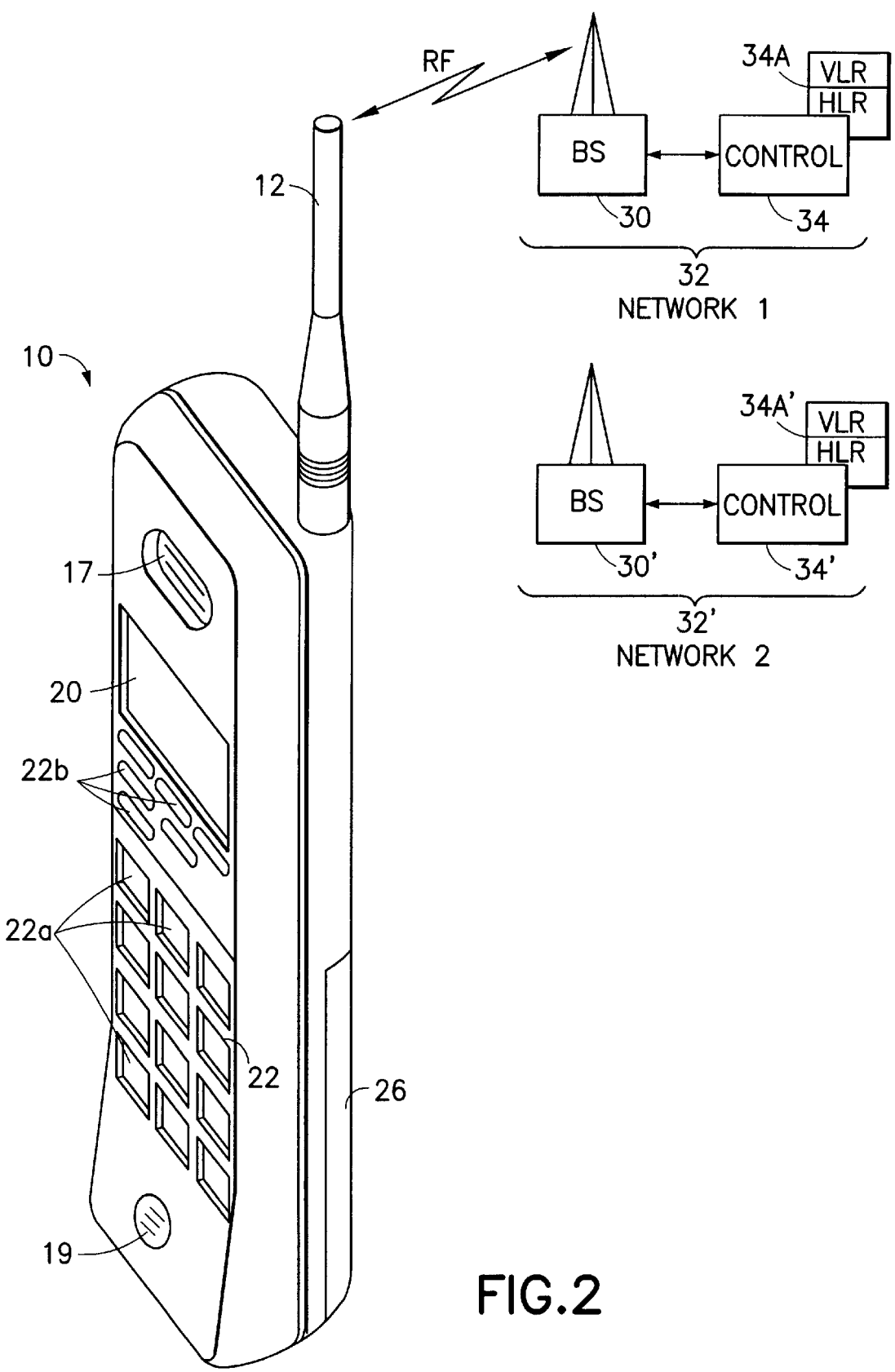
FIG. 2 is an elevational view of the mobile equipment shown in FIG. 1, and which further illustrates telecommunication systems to which the mobile equipment can be bidirectionally coupled through wireless RF links.

Reference is first made to FIGS. 1 and 2 for illustrating a wireless user terminal or mobile equipment 10, such as but not limited to a cellular radio telephone or a personal communicator, that is suitable for practicing this invention. The mobile equipment 10 includes an antenna 12 for transmitting signals to and for receiving signals from a base site or base equipment 30. The base equipment 30 is a part of a first wireless telecommunications network 32 comprising a network control function 34 and interface to land line trunks when the mobile equipment 10 is involved in a call. A second network 32' is also shown, and other networks may be present as well. By example, the mobile equipment 10 may be a dual band device for communicating with either of the networks 32 and 32', which may be, by example only, a GSM network 32 and an UMTS network 32'. Each of the two networks is shown to contain a VLR/HLR pair 34A, 34A'.

The mobile equipment 10 typically includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable network 32 or 32', and also user speech and/or user generated data. It is understood that the controller 18 also includes the circuitry required for implementing the audio and logic functions of the mobile equipment 10. By example, the controller 18 may be comprised of a digital signal processor device, a microprocessor device, and various analog to digital converters, digital to analog converters, and other support circuits. The control and signal processing functions of the mobile equipment are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile equipment 10. These other keys 22b may include, by example, a SEND key, various menu scrolling and soft keys, and a PWR key. The mobile equipment 10 also includes a battery 26 for powering the various circuits that are required to operate the mobile equipment.

The mobile equipment 10 also includes various memories, shown collectively as the memory 24, wherein are stored an operating program, as well as constants and variables that are used by the controller 18 during the operation of the mobile equipment 10.

It should be understood that the mobile equipment 10 can be a vehicle mounted or a handheld device. It should further be appreciated that the mobile equipment 10 can be capable of operating with one or more air interface standards, modulation types, and access types.

The mobile equipment 10 further is coupled to, preferably, a removable data card which will be referred to herein as a Universal Mobile Telecommunications System (UMTS) Integrated Circuit Card (UICC) 28. In the illustrated embodiment, shown in greater detail in FIG. 3, the UICC 28 contains both GSM SIM applications and UMTS USIM applications. Other applications may also reside on the UICC 28.

Figure 3:
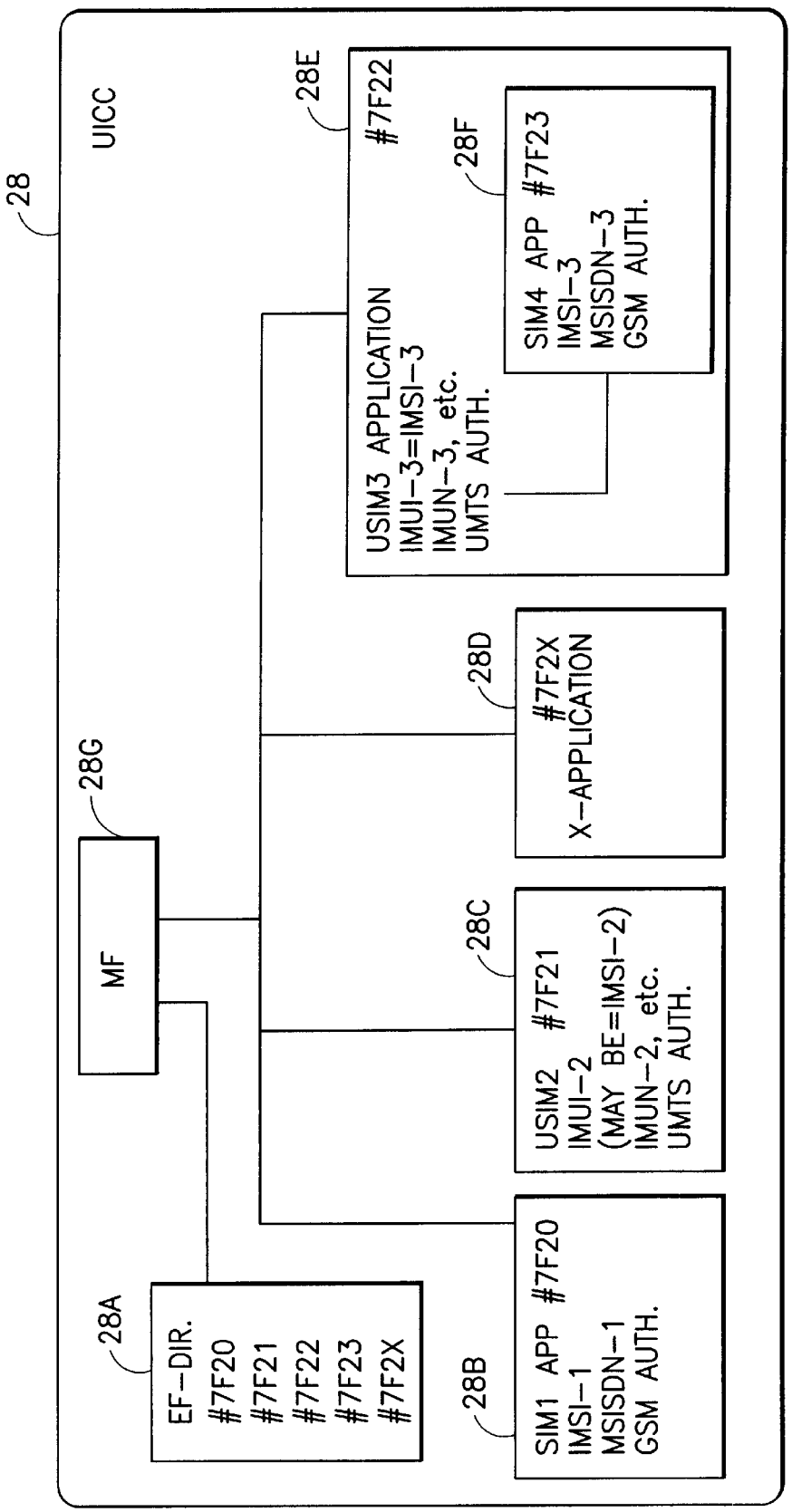
FIG. 3 shows an example of a UMTS Integrated Circuit Card (UICC) that contains both GSM SIM applications and UMTS USIM applications (other applications may also reside in the UICC)

Referring now to FIG. 3, an elementary file structure directory (EF-dir) register 28A contains pointers to the different applications that the mobile equipment 10 can read. For the case where the UICC 28 is intended to be used in a GSM mobile terminal it must have the SIM1 28B application #7F20, since GSM terminals are capable of handling only this particular pointer. It is assumed that both UMTS and dual mode GSM-UMTS terminals can read the enhanced elementary file structure (28A) of the UICC card 28. With general reference to GSM terminals, as well as SIM functions, reference can be had to "The GSM System for Mobile Communications", by Michel Mouly and Marie-Bernadette Pautet, 1992, the disclosure of which is incorporated by reference in its entirety.

The International Mobile User Identity (IMUI) and the International Mobile Subscriber Identity (IMSI) represent or manifest the subscriber identities, while the International Mobile User Number (IMUN) and Mobile Station ISDN (MSISDN) are the telephone numbers of the user. It should be noted that MSISDN/IMUN need not be contained in the UICC 28, since the IMSI-MSISDN and IMUI-IMUN mappings are only performed in the network 32 or 32'. The MSISDN and IMUN are shown in FIG. 3 simply for completeness, as one or both may be present.

It is pointed out that herein the identifier of the UMTS subscriber is referred to as the IMUI in order to distinguish from GSM. However, the IMUI may or may not be the same as the GSM IMSI (defined in GSM 03.03). In FIG. 3 the exemplary content of the UICC 28 includes, in addition to the EF-dir 28A and the SIM1 28B application, the following SIM or Universal Subscriber Identity Module (USIM) applications (DFs):

| | |
|---|---|
| 28C USIM2 | #7F21 |
| 28D X-Application | #7F2X (i.e., any application) |
| 28E USIM3 | #7F22 |
| 28F SIM4 | #7F23 |

Note that SIM1 and SIM4 are GSM-related applications having GSM authorizations, while USIM2 and USIM3 are UMTS applications having UMTS authorizations. Also included is the Master File (MF) 28G that acts as a logical root for applications in the UICC 28.

Figure 4:
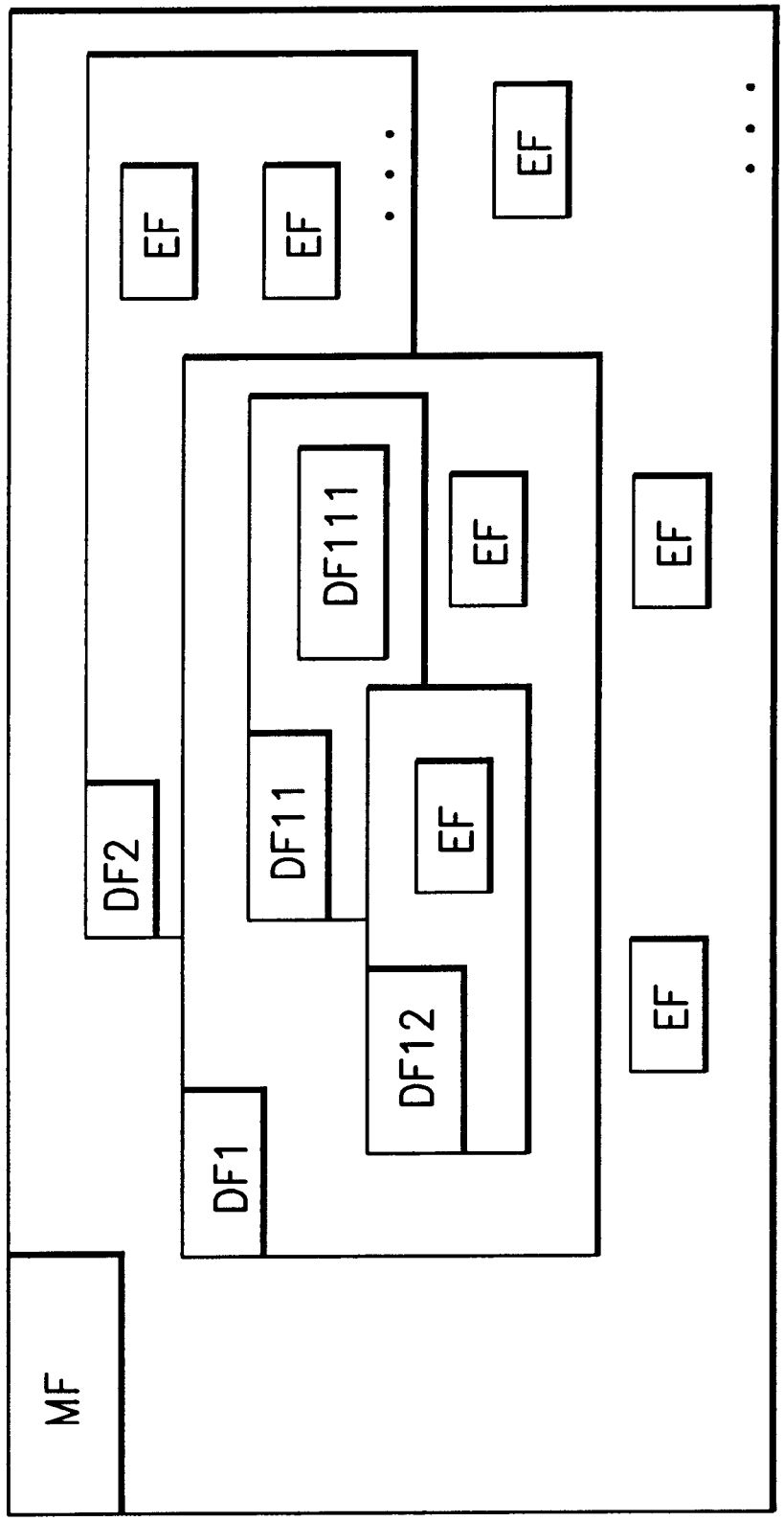
FIG. 4 shows a prior art organization of memory in a SIM.

Further in this regard, and reflecting again on FIG. 4 and the previous discussion, the EF is an Elementary File. For example, $EF_{IMSI}$ would be an elementary file containing International Mobile Subscriber Identity (IMSI) data within an application. Typically, the applications will contain more EFs than those depicted in FIG. 3.

It should be noted that the word "application" is used so that it has two different meanings in this invention. In one case it means a Dedicated File in the UICC 28 containing all necessary Elementary Files and methods to access the corresponding network. In another case it may also mean an application program or feature inside of a Dedicated File. An example is authentication.

The individual EFs within the UICC 28 are grouped into Dedicated Files (DFs), that are collected into the MF 28G. The MF 28G is a logical root of the UICC file hierarchy. The DF is referred to as an Application in this invention, since it collects all of the files and methods necessary to access the corresponding network.

The value 7F20 is a predefined ID for a GSM application (directory, dedicated file). In general, any ID could be used. As was indicated previously, the hexadecimal value '7F' means 1st level directory, etc, while an ID beginning with '3F' relates to the MF 28G. Values of IDs other than 7F20 are not particularly relevant to the description of this invention. What is important to note is that each application in the same "level" must own a different ID.

The X-application could as well be referred to as 'Any Application'. It can be a GSM or UMTS application, or some other, even non-cellular application. It may be an application that is understandable by the mobile equipment 10, or just some part of the mobile equipment 10. What is important to note is that whether it pertains to the mobile equipment or not, in accordance with the teachings of this invention the mobile equipment 10 can inform the network about the X-application (Any Application), if it exists in the UICC 28.

The SIM and USIM applications shown in FIG. 3 may have different capabilities, and an aspect of this invention enables the system 32 or 32' to accommodate the different capabilities in an efficient and compatible way.

The mobile equipment 10 having, by example, both GSM and UMTS capabilities is capable of operating in both types of networks 32, 32', and can roam between these two networks. There can exist more than one version of a single application, which should continue to operate when moving from network to another. Authentication is one example of such an application. For example, the GSM authentication is required to operate also in the UMTS network 32' in order to allow GSM SIMs to access UMTS, but the UMTS authentication may not work in the GSM network 32.

As such, it can be realized that if the network knew the capabilities of the SIM/USIM 28, it could immediately start using UMTS authentication instead of first trying GSM authentication, thus making the authentication procedure faster with improved security.

An aspect of this invention is thus to present methods and apparatus for enabling the network 32 or 32' to obtain information about the capabilities of the SIM/USIM 28.

When the mobile equipment 10 is roaming in another network, the VLR of the visited network sends a query to the HLR of the mobile equipment's home network. The VLR is required to obtain information concerning the capabilities of the SIM or USIM card used, what the class of the mobile equipment is, etc. The HLR, however, may or may not store information about SIM or USIM card capabilities.

In accordance with an aspect of this invention the VLR of the roamed-to network requests the card capability information from the SIM/USIM card. The mobile equipment can send the capability information of the USIM/SIM card to the VLR in a number of different ways.

For example, in one technique the capability information can be placed in a message that is defined for this purpose. In another example the capability information can be placed in a Location Update message. In a further example, the capability information can be sent as a response to an authentication request sent by network, if the parameters are not the best possible (in this case the application is authentication).

The mobile equipment 10 requests the capability information stored in the SIM/USIM card, i.e., the UICC 28 in the preferred embodiment, using one of the following methods.

In a first method the mobile equipment 10 passes a newly defined command to the UICC 28 and receives the stored capability information as a response. In a second method the mobile equipment 10 selects a specific elementary file from the UICC 28 and reads it. The content of this specific file indicates the capabilities of the UICC 28.

After having received information concerning the capabilities of the UICC 28, via the mobile equipment 10, the VLR 34A, 34A' and network 32, 32' can use the application (s) supported by the UICC 28 with the most optimum parameters. These applications can be of any type, and can include, by example, authentication applications and user profile configuration applications.

It is desirable to define and standardize a description of the capabilities of the UICC 28. One possible way to accomplish this is by defining a UICC Classmark parameter. This parameter is given a defined value for certain UICC capabilities. One suitable example is shown in the following Table.

TABLE

| Capability | Classmark value |
|---|---|
| Support for GSM authentication | xx |
| Support for UMTS authentication | yy |
| Support for both GSM and UMTS authentication | zz |

TABLE-continued

| Capability | Classmark value |
|---|---|
| Support for application x | ww |
| Unused parameter values are reserved for future applications and capabilities. | |

It should be realized that the teachings of this invention are not limited to only the GSM and UMTS applications and algorithms listed immediately above, and that in general other types of applications and algorithms could be substituted.

Furthermore, in an alternative embodiment of the teachings of this invention one may define for each USIM its own set of algorithms, and the USIM and the HLR would agree on or share mutual information on the algorithms. For example, the algorithm appearing in the first row would be the most preferred, etc. In this case the VLR would only request authentication with algorithm #1 and provide the RAND as provided by the HLR. It would then receive a SRES and make a comparison. If the HLR is not aware of the USIM's capabilities, then the HLR could use the same "UMTS algorithm" to calculate SRES for all its IMSIs (USIMs), the point being that the SIM and the HLR (AuC) have the same understanding, whereas the VLR can only perform the comparison.

As such, it should be appreciated that in the foregoing Table the specific references to "GSM" and "UMTS" are exemplary, and that the instances of "GSM" could be replaced by the generic "Algorithm Y", while the instances of "UMTS" could be replaced by the generic "Algorithm Z", to indicate that the teachings of this invention are not restricted to only GSM and UMTS applications, algorithms and implementations.

It has been made apparent that the use of the UICC 28 involves two separate interfaces which must be handled separately: the local UICC-mobile equipment interface and the wireless mobile equipment-network interface. For both interfaces it may be desirable to define one or more new commands having a response optimized for either retrieving the capabilities of the UICC 28 to the controller 18 of the mobile equipment 10, or transferring the retrieved UICC capability parameters to the requesting network control 34. However, and by example, UICC capabilities sent to the network 32 or 32' as a response to an authentication command may give the optimum performance (at least for the authentication application).

It should be noted that not all of the content in the UICC 28 need be transmitted to the network. For example, it may be desirable to allow the transmission of some "common" information freely, e.g., the type of authentication, but not to allow transmission of application specific or user specific information without some type of authorization, such as authentication. If there is a roaming agreement between two networks, then it may not be objectionable to allow both of the networks to request and receive the capability of its own or the others application(s). For example, if the UICC 28 contains application A (but not B), and is roaming in the area of network B, and networks A and B have a roaming agreement, then network B can request information of application A. The query can also be authenticated so that a different network C, which may not have a roaming agreement with network A, cannot query information regarding the application A. In this case perhaps the user has application C in the UICC 28 in order to be able to access network C. With regard to the definition of a subset of transferred data, certain common data, for example, the type of authentication, may simply be defined in the standards (as was indicated above). However, it may also be desirable to define more private data within an operator and its 'friend' operators, such as those with which it has roaming agreements. The format of the query may be common, so that some parameter or key value defines or specifies exactly what information is being requested. For example, one suitable format for a query could be:

GetCapability( typeofcapability, &value ).

If the typeOfCapability parameter is "authentication", the value may be returned to anyone requesting. But if the parameter is, for example, "remaining amount of payment", the query may first be authenticated to prevent unwanted parties from obtaining the information. The former type of query may be standardized, whereas the latter type of query may well be network operator specific.

Although described above in the context of the GSM network 32 and the Universal Mobile Telecommunications System (UMTS) network 32', it should be realized that the teachings of this invention are not limited for use with only these two network types. For example, one of the two networks could be a IMT-2000 network, or another existing 2G network such as an 800 MHz CDMA or TDMA network. Tri-mode and higher mobile equipments are also within the scope of the teaching of this invention, and in this case the UICC 28 can store capability information relating to three or more different networks.

It should further be noted that the teachings of this invention are not limited to only the various types of public networks mentioned, but are also applicable for use with private networks.

In addition, the USIM or UICC could be placed in, by example, a laptop computer connected to a wireline local area network (LAN), and the operation of this invention can be the same or similar to that disclosed above.

Thus, while the invention has been particularly shown and described with respect to preferred embodiments thereof, it will be understood by those skilled in the art that changes in form and details may be made therein without departing from the scope and spirit of the invention.

What is claimed is:

1. A method of operating a mobile equipment, comprising steps of:
   providing a data storage module that is readably coupled to the mobile equipment, the module storing information for specifying identities of applications that are executable by the module when operating in each of a plurality of different networks;
   in response to a request from one of the networks, accessing the module to retrieve the stored information; and
   transmitting the retrieved information to the requesting one of the networks.

2. A method as in claim 1, wherein the step of transmitting transmits the retrieved information using a response to a dedicated message type defined for transmitting the retrieved information.

3. A method as in claim 1, wherein the step of transmitting transmits the retrieved information using a response to a message type originally defined for a purpose other than transmitting the retrieved information.

4. A method as in claim 1, wherein the step of transmitting transmits the retrieved information using a response to an authentication request that is received from the network.

5. A method as in claim 1, wherein the step of accessing uses a dedicated message type defined for accessing the module to retrieve the stored information, and wherein the module responds to the dedicated message type by returning the requested stored information.

6. A method as in claim 1, wherein the step of accessing selects a predetermined file stored in the module, the predetermined file having a content that indicates the operational capabilities of the module, and wherein the module returns the content of the predetermined file.

7. A method of operating a mobile equipment, the method comprising steps of:
  providing a data storage module that is readably coupled to the mobile equipment, the module storing information for specifying at least an identification and the operational capabilities of the module in each of a plurality of different networks;
  in response to a request from one of the networks, accessing the module to retrieve the stored information; and
  transmitting the retrieved information to the requesting one of the networks, wherein the step of transmitting transmits at least one Classmark value that specifies the operational capability of the module.

8. A mobile equipment, comprising:
  a controller coupled to a wireless transceiver for bidirectionally communicating with one of a plurality of different networks;
  a data storage module that is readably coupled to said controller, said module storing information for specifying identities of applications that are executable by the module when operating with said plurality of different networks; and
  said controller being responsive to a request received from one of said plurality of networks through said transceiver for accessing said module to retrieve the stored information and for transmitting the retrieved information to said requesting one of said networks through said transceiver.

9. Mobile equipment as in claim 8, wherein said controller transmits the retrieved information using a response to a dedicated message type defined for transmitting the retrieved information.

10. Mobile equipment as in claim 8, wherein said controller transmits the retrieved information using a response to a message type originally defined for a purpose other than transmitting the retrieved information.

11. Mobile equipment as in claim 10, wherein said message type is a Location Update message type.

12. Mobile equipment as in claim 8, wherein said controller transmits the retrieved information using a response to an authentication request that is received from said network.

13. Mobile equipment in claim 8, wherein said controller uses a dedicated message type defined for accessing said module to retrieve the stored information, and wherein said module responds to the dedicated message type by returning the requested stored information.

14. Mobile equipment as in claim 8, wherein said controller selects a predetermined file stored in said module to retrieve the stored information, and wherein said module returns content of the predetermined file.

15. Mobile equipment as in claim 8, wherein said request is initiated by a VLR of said requesting network, and wherein said retrieved information is transmitted through said transceiver back to said VLR.

16. Mobile equipment as in claim 8, wherein one of said plurality of different network types is comprised of a GSM network.

17. Mobile equipment as in claim 8, wherein one of said plurality of different network types is comprised of a UMTS network.

18. A mobile equipment, comprising:
  a controller coupled to a wireless transceiver for bidirectionally communicating with one of a plurality of different networks;
  a data storage module that is readably coupled to said controller, said module storing information for specifying at least an identification and the operational capabilities of said module in each of said plurality of different networks; and
  said controller being responsive to a request received from one of said plurality of networks through said transceiver for accessing said module to retrieve the stored information and for transmitting the retrieved information to said requesting one of said networks through said transceiver, wherein said controller transmits at least one Classmark value that specifies the operational capability of the module.

19. An electronic data storage module comprising:
  a memory for storing information for specifying identities of applications that are executable by the module in each of a plurality of different wireless telecommunications networks; and
  an interface for electrically coupling said memory to a mobile equipment for at least making read accesses of said memory, said interface being responsive for retrieving the stored information in response to a request from a wireless telecommunications network for gaining access to the stored information.

20. An electronic data storage module as in claim 19, wherein said information for said different networks is stored in certain different regions of said memory, and further comprising a directory portion that stores pointers to said certain different regions.

21. A method of operating a mobile equipment, comprising steps of:
  providing a data storage module that is readably coupled to the mobile equipment, the module storing information for specifying identities of applications that are executable by the module in each of a plurality of different networks;
  in response to a request from one of the networks, accessing the module to retrieve the stored information only if the requesting network is authorized to receive the requested information; and
  transmitting the retrieved information to the requesting one of the networks.

22. A method of operating a mobile station, comprising:
  providing a data storage module that is readably coupled to the mobile station, the module storing information for specifying identities of applications that are executable
  by the module when operating in each of a plurality of different networks;
  in response to a request from a Visitor Location Register (VLR) of a roamed-to network, accessing the module to retrieve the stored information; and
  transmitting the retrieved information from the mobile station to the VLR of the roamed-to network.

23. A mobile station, comprising:
  a controller;
  a first interface for bidirectionally coupling to a wireless network;

a second interface for at least readably coupling to an information storage module, the module storing information for specifying the identity of the module when operating with different wireless networks, and for specifying capabilities of the module when operating with the different wireless networks, the information specifying the capabilities comprising identities of applications that are executable by the module;

said controller being coupled to said second interface for receiving the capabilities of the module from the module; and said module being coupled to said first interface for transmitting at least the capabilities of the module to the wireless network.

24. A mobile station as in claim 23, where said module transmits at least the capabilities of the module to the wireless network in response to a query by the wireless network.

25. A mobile station as in claim 23, where some information transmitted from module through the first interface is transmitted without requiring authorization, and other information is transmitted only after authorization.

26. A mobile station as in claim 23, where said module transmits information to the wireless network in response to receiving a wireless network standardized query.

27. A mobile station as in claim 23, where said module transmits information to the wireless network in response to receiving a wireless network operator-specific query.

28. A mobile station as in claim 23, where said module stores information for identifying both GSM applications and UMTS applications.

* * * * *